July 16, 1929.  H. MYERS  1,721,130

PAN SCRAPER

Filed March 10, 1928

Inventor

Homer Myers,

By Clarence A O'Brien
Attorney

Patented July 16, 1929.

1,721,130

UNITED STATES PATENT OFFICE.

HOMER MYERS, OF OREGON CITY, OREGON.

PAN SCRAPER.

Application filed March 10, 1928. Serial No. 260,623.

This invention relates to new and useful improvements in scrapers for pans, kettles and the like, and aims to provide a scraper including a blade member having a plurality of corners of various curvatures, the blade being readily adjustable so that the proper corner may be presented to a corner of a particular pan, so that the proper scraping thereof may be brought about.

In the drawing, wherein like reference characters indicate corresponding parts in both of the views.

Figure 1:
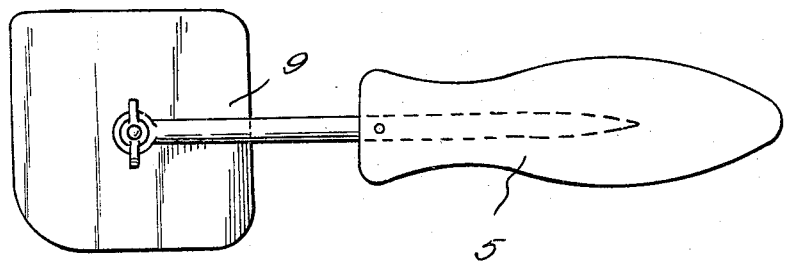
Figure 1 is a plan view of my improved scraper.
Figure 2:
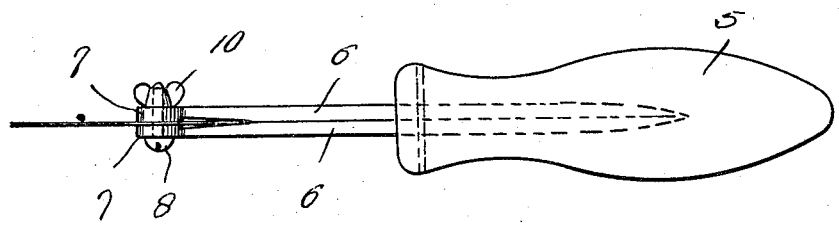
Figure 2 is a side view thereof.

Now having particular reference to the drawing, my novel scraper consists of a suitable handle 5, driven longitudinally into the center of the handle 5 at the forward end thereof is a pair of superposed spring steel stems 6—6 the inner ends of which are pointed as disclosed by the dotted lines in Figures 1 and 2. The outer surfaces of these stems are preferably rounded, while the mating surfaces thereof are plane, the forward ends of these stems being formed with flattened rounded portions 7—7 formed with registering openings for the reception of a screw 8. Directly in back of these rounded portions, the adjacent surfaces of these stems 6—6 are beveled, to provide a space therebetween.

Arranged between these rounded ends 7—7 of the stems 6—6 is a scraping blade 9, formed centrally with an opening, through which said screw 8 projects to provide a pivot for the blade. Threaded upon the threaded end of the screw 8 is a wing nut 10, so that by tightening the screw, the blade 9 is tightly maintained in predetermined position.

Disclosed in Figure 1, the plate 9 is preferably of square shape, while the four corners thereof are of differing curvatures so as to provide a plurality of scraping edges for engagement within the corners of various designs of pans, to facilitate the scraping of said pans especially in their corners.

It will thus be seen that I have provided a highly novel, simple and extremely useful pan scraper that is well adapted for all of the purposes heretofore designated, and even though I have herein shown and described the invention as consisting in certain detail structural elements, it is nevertheless to be understood that some changes may be made therein without affecting the spirit or scope of the appended claim.

Having thus described my invention, what I claim as new is:

In a scraper of the character described, a handle member, a pair of metallic stems driven longitudinally into the inner end of the handle in parallel contacting relation, the outer ends of said stems being flattened and having registering openings, a blade disposed between the flattened ends of said stem, said blade having an opening for registering with the openings in the said ends of the stems, and a releasable locking connection disposed through said opening and adapted to be tightened to bind the intermediate portions of said stems against an edge portion of the blade.

In testimony whereof I affix my signature.

HOMER MYERS.